United States Patent [19]

Watkins, Jr. et al.

[11] Patent Number: 4,867,249

[45] Date of Patent: Sep. 19, 1989

[54] DRIVING AND SETTING TOOL

[76] Inventors: Rex A. Watkins, Jr., 4847 Bundy Rd., Coloma, Mich. 49038; James S. Thompson, 8265 Brookcrest, Portage, Mich. 49002

[21] Appl. No.: 232,911

[22] Filed: Aug. 16, 1988

[51] Int. Cl.[4] .............................................. B23B 45/16

[52] U.S. Cl. ...................................... 173/29; 173/132; 7/158

[58] Field of Search .................... 173/29, 132, 128, 48; 408/118, 239 A; 7/158; 72/391; 8/44; 227/147, 51, 52, 53, 55; 81/463, 44; 279/103, 1 A, 1 R

[56] References Cited

U.S. PATENT DOCUMENTS

| | | | |
|---|---|---|---|
| 2,543,942 | 3/1951 | Shaff | 227/149 X |
| 2,725,558 | 12/1955 | Munson | 81/44 |
| 2,743,444 | 5/1956 | Thomas | 81/44 |
| 2,896,209 | 7/1959 | Hilti | 227/147 |
| 3,370,655 | 2/1968 | Chromy | 173/132 X |
| 3,724,738 | 4/1973 | Hurst | 227/147 |
| 3,932,904 | 1/1976 | Nilsson et al. | 7/158 |
| 3,965,510 | 6/1976 | Ernst | 7/158 |
| 4,525,111 | 6/1985 | Gutsche | 408/239 A |

FOREIGN PATENT DOCUMENTS

| | | | |
|---|---|---|---|
| 2822372 | 11/1979 | Fed. Rep. of Germany | 7/158 |

*Primary Examiner*—Frank T. Yost
*Assistant Examiner*—James L. Wolfe

[57] ABSTRACT

A tool attachment for a percussion drill power tool which expands and sets, essentially but not limited to, fastening anchors used in concrete and masonry. The tool's body is generally cylindrical and is mostly hollow to slip over a drill bit (38, 74) of the percussion drill, using a spring clip (24, 124) to keep it from falling off. The opposite end of the tool has either a coaxial concave recess (54, 154, 354, 454) to place onto an anchor (58) or a coaxial plunger (260) to slip into a mostly hollow anchor (258) that are placed into a drilled hole (64, 264). The anchor (58, 258) is then expanded and set into the concrete or masonry by the hammering action transmitted through the tool by the percussion drill.

11 Claims, 5 Drawing Sheets

DRIVING AND SETTING TOOL

BACKGROUND

1. Field of Invention

This invention relates to driving and setting devices, more specifically to devices that attach to percussion drill power tools, which when used in conjunction with the percussion drill will drive and set various types of fastening anchors used in the field of construction.

2. Description of Prior Art

There are many types of anchors used in construction to fasten materials to various surfaces.

Heretofore an anchor placed into a hole drilled in concrete or masonry had to be struck with a hammer; a hammer set or expanded the body of the anchor outwardly into the concrete or masonry, holding it in place. Hammering anchors in manually is very labor intense, costly, and fatiguing; this is especially true when working overhead and in areas close to finish materials, other objects, etc.

One tool found with a slip-over design evidently being an embodiment different from the drawings accompanying its U.S. Pat. No. 3,965,510, while intended for a different function does slip over the drill bit of a power tool, but relies on a special drill bit having an uncommon shank design, requiring a ball-detent retainment system.

Another tool, U.S. Pat. No. 2,481,304, has a concave recess adjoining a cavity filled with toxic lead which was not designed to receive the constant repetition of blows from a percussion drill.

Another tool, U.S. Pat. No. 1,213,970, in its preferred embodiment, which attaches to a jack hammer, is awkward with several moving parts requiring lubrication, thus soiling the work material and everything in the vacinity.

Another tool, U.S. Pat. No. 2,743,444, if modified to perform a similar function of the present invention, lacks several necessary features. One is a way to effectively mate with anchors of various designs. Also lacking is a way to recess the spring clip to prevent it from disengaging and snagging nearby objects. The invention includes two retaining spring designs: the wire spring may twist up and away, the other spring clip lacks a flex gap to allow it to securely fit into a recess. The invention is also unable to remain centered on the drill bit and unable to protect the cutting tip of the drill bit inserted therein during use.

Tradesmen, therefore, would find it desirable to have a durable, streamline tool that could easily be attached to any drill bit of a percussion drill and effortlessly drive an anchor which would normally be laborously driven in with a hammer.

OBJECTS AND ADVANTAGES

The primary objects and advantages of our invention are: to provide a tool which saves time and labor by quickly and conveniently driving and setting various anchor designs versus manual hammering, to prevent damage and stress to work materials, work surfaces, and the anchors themselves since a hmmer is not used, and to drive anchors into tightly spaced areas where the use of a hammer would be difficult or impossible.

Another object of the invention is to enable the percussion drill and tool to be conveniently used, unefected by the vibration and rotation incident to the operation of the percussion drill, and to utilize the hammering action already available from the percussion drill.

Another object of the invention, in its preferred embodiment, is to be expeditiously attached to and removed from the percussion drill without disturbing the assembled relationship of the percussion drill and the drill bit.

Numerous other advantages of the invention and its various embodiments will become apparent from the following description taken in conjunction with the accompanying drawings.

DRAWING FIGURES:

FIG. 1 is a longitudinal, partly sectional view, showing the driving and setting tool in place over a drill bit. The drill bit is in the snap action keyless chuck of a percussion drill. The head of the tool is placed upon the pin of an anchor, ready to drive the anchor into place.

DETAILED DESCRIPTION

Figure 1:
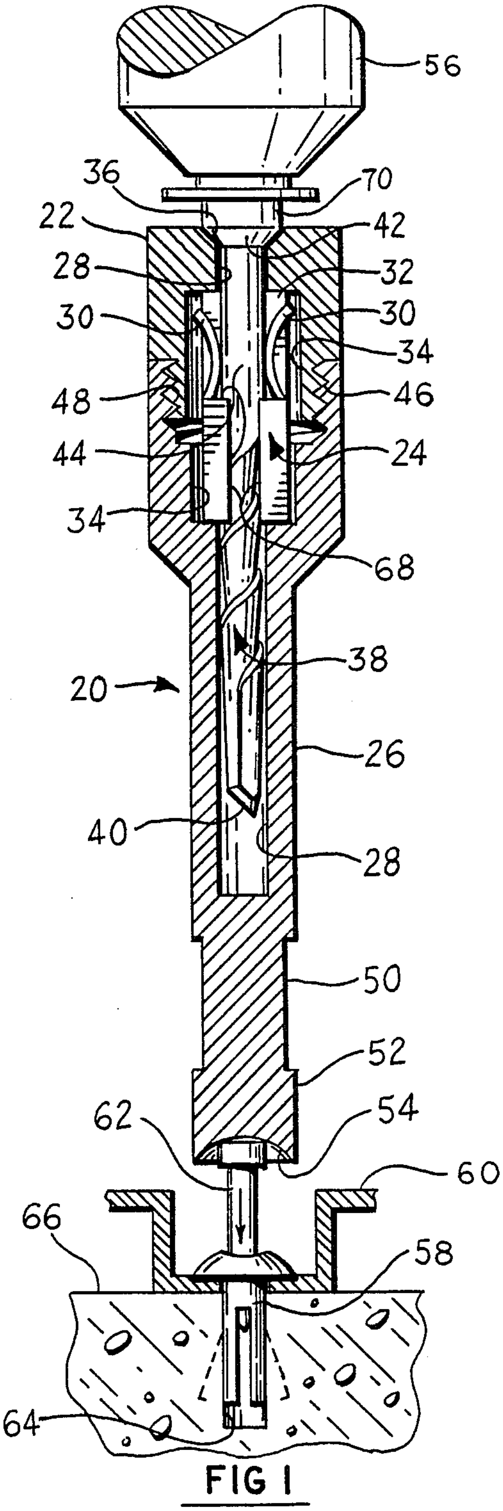
Figure 2:
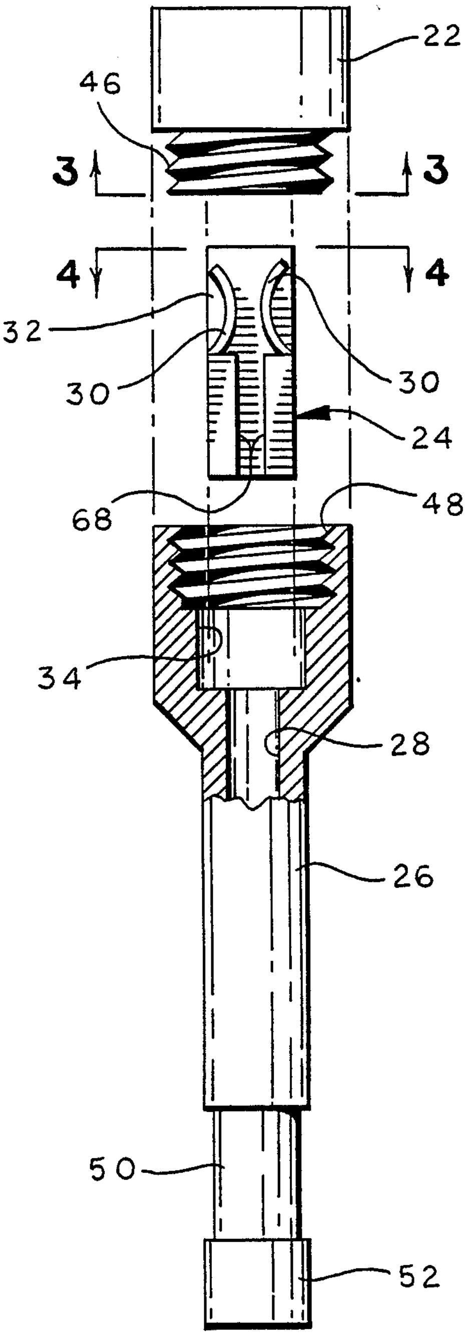
FIG. 2 is a longitudinal, partly sectional, exploded view showing the three components of the driving and setting tool in its preferred embodiment.
Figure 3:
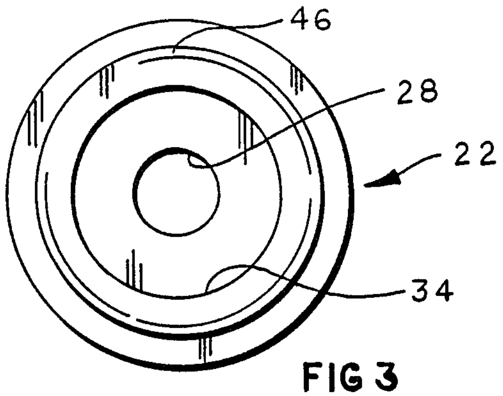
FIG. 3 is a plan view of the cap, taken on the line 3—3 of FIG. 2.

FIG. 1 illustrates the driving and setting tool 20 that is the subject of the present invention in its preferred embodiment. As seen in FIG. 2 the tool 20 comprises primarily a body 26 having female threads 48, a spring clip 24, and a cap 22 having male threads 46 which screw into the female threads 48 of the body 26. FIG. 3 shows the cap 22 from another view.

After a hole 64 is drilled through a work material 60 and into a work surface 66, the tool 20 is attached to a snap action keyless chuck drill bit 38 of a percussion drill 56, as best illustrated in FIG. 1. To attach the tool 20, the snap action keyless chuck drill bit 38 is inserted into a cavity 28, between the leaves 30 of a spring clip 24 which is contained within a chamber 34.

When the snap action keyless chuck drill bit 38 is fully inserted into the tool 20, the tapered drill bit shoulder 42 seats and centers itself against the matching tapered female embrasure 36. This prevents the cutting tip 40 from touching the bottom of the cavity 28, thus preventing damage to the cutting tip 40. This also prevents the top of the tool 20 from making damaging contact with the chuck of the percussion drill 56.

Figure 4:
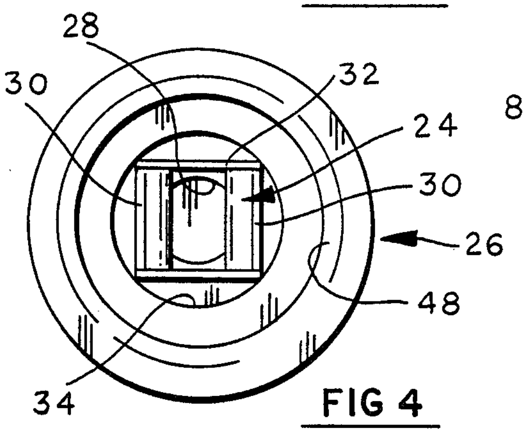
FIG. 4 is a plan view of the body and spring clip taken on the line 4—4 of FIG. 2.
Figure 5:
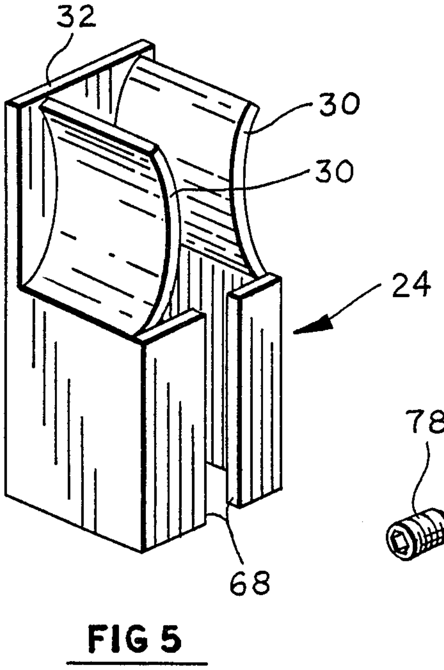
FIG. 5 is a perspective view of the spring clip.

To prevent the tool 20 from accidentally slipping off, the spring tension of the leaves 30 of the spring clip 24 grip the drill bit body 44 securely. The flex gap 68 allows the spring clip 24 to be tightly inserted into the chamber 34. This prevents the spring clip 24 from rotating non-relative to the chamber 34, thus preventing heat and friction damage, as best illustrated in FIG. 4. Removing and installing the spring clip 24 is facilitated by removing the cap 22 and then gripping the flange 32, best illustrated in FIG. 5, with pliers or another suitable tool.

Referring again to FIG. 1, it can be seen that once the anchor 58 has been inserted through the work material 60 and into the drilled hole 64, the concave recess 54 in the head 52 is placed onto the pin 62 of the anchor 58. When the percussion drill 56 is activated, its hammering action is transmitted through the tool 20 and thus to the pin 62. This causes the pin 62 to travel into the anchor 58, thus expanding the anchor 58 in the drilled hole 64. This action securely fastens the anchor 58 and the work material 60 to the work surface 66. The simultaneously rotation of the drill bit 38 and thus the tool 20 during this process helps keep the tool centered. Several other anchor designs that require a hammering action work equally well.

As best illustrated in FIG. 2, the annular sulcus 50 would make it very convenient to clip the tool 20 onto a work belt or into a percussion drill carrying case for easy storage. The annular sulcus 50 can also be used as a finger grip area.

Figure 8:
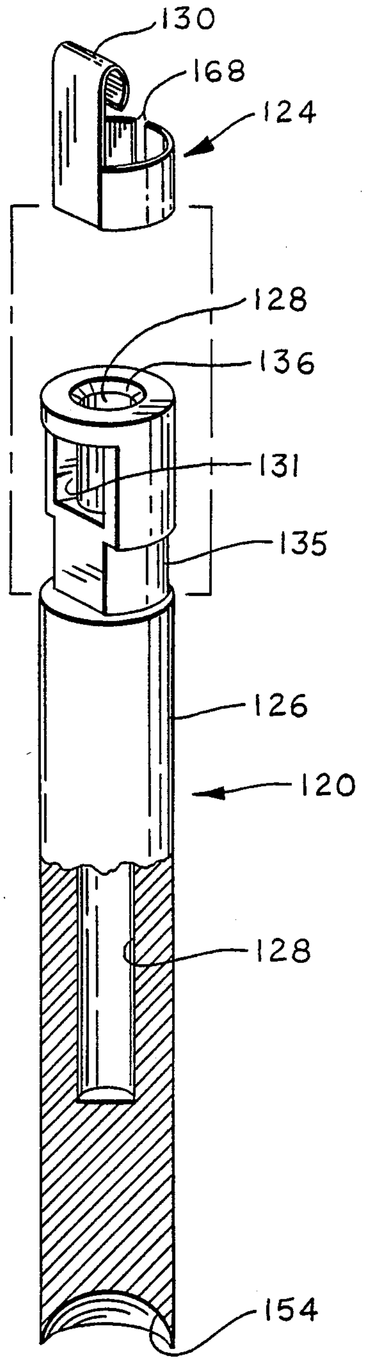
FIG. 8 is a longitudinal perspective view, exploded and partly sectional showing a further embodiment of the tool of FIG. 2, having an external spring clip.
Figure 9:
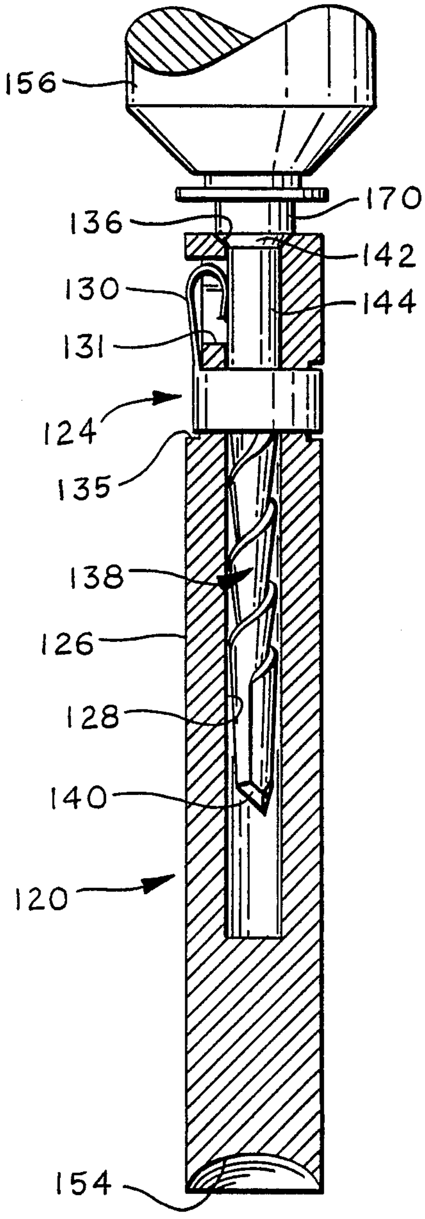
FIG. 9 is a longitudinal, partly sectional view showing the tool of FIG. 8 assembled with a percussion drill and drill bit.

A further embodiment as illustrated in FIG. 8 and FIG. 9 is a slip-over design where the spring clip 124 is removably retained on the exterior of the tool 120 by clipping into an annular recess 135. The leaf 130 of the spring clip 124 protrudes through the port 131 and into the cavity 128, which enables the leaf 130 to make tensioned contact with the drill bit 138, thus preventing the tool 120 from accidentally slipping off the drill bit 138.

Figure 6:
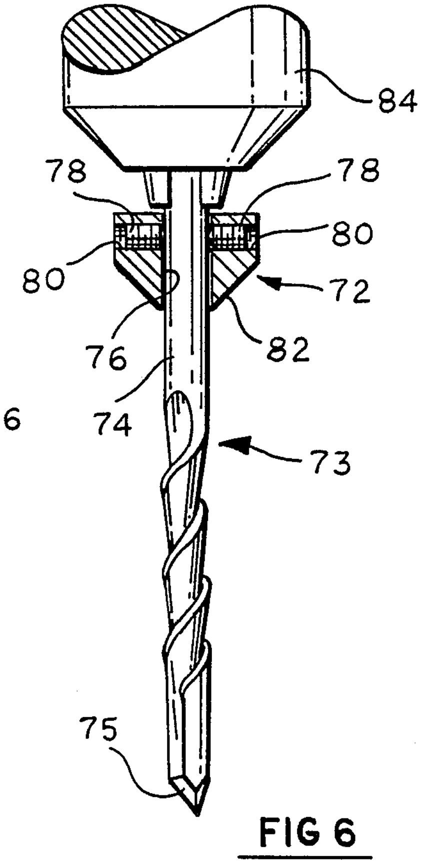
FIG. 6 is a longitudinal, partly sectional view of an adapter collar in place on a standard shank drill bit of a percussion drill having a three jaw chuck.
Figure 7:
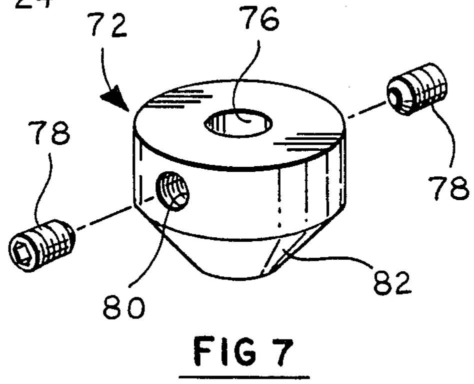
FIG. 7 is a perspective exploded view of the collar and set screws.

To use the slip-over embodiments of the tool 20 in FIG. 2 and the tool 120 in FIG. 8 with a percussion drill having a three jaw chuck 84 which uses a standard shank drill bit 73 as illustrated in FIG. 6, another component is necessary. FIG. 7 best illustrates an adaptor collar 72 with its lower end having a tapered shoulder 82 which matches the taper of the female embrasure 36 of FIG. 1 and the female embrasure 136 of FIG. 8. Referring again to FIG. 6, the collar 72 is also equipped with two opposing threaded bores 80, each containing a set screw 78. The standard shank drill bit 73 is slipped through a drill bit hole 76 of the collar 72. At an appropriate location on the drill bit body 74, the set screws 78 are tightened securely. This drill bit 73 and collar 72 assembly is now ready for use.

Figure 10:
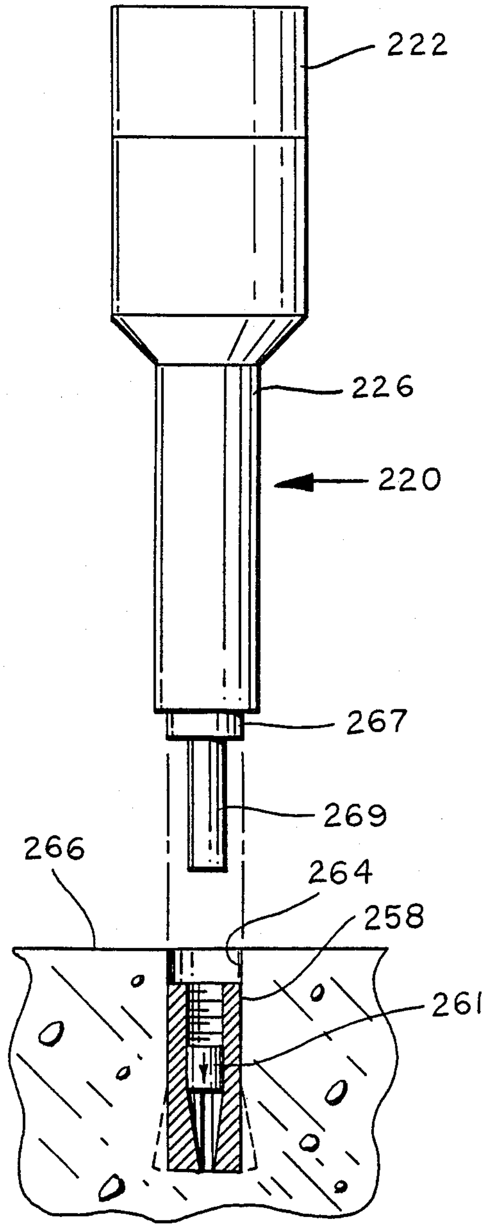
FIG. 10 is a longitudinal, partly sectional, exploded view showing a further embodiment of the tool of FIG. 2 and a recess anchor, with a modification to the head shown in FIG. 2.

A further embodiment, as illustrated in FIG. 10, is the same as that shown in FIG. 1, except for the driving end of the tool 220. This embodiment can be used for setting a mostly hollow anchor 258, generally used in a recessed fashion to hold threaded objects, where the concave recess 54 of FIG. 1 would not apply. Referring again to FIG. 10, the plunger shaft 269 slips into the anchor 258 to hammer the plunger 261 downward which expands the anchor 258 into the work surface 266, thus holding the anchor 258 in place. The set ring 267 keeps the anchor 258 recessed in the drilled hole 264 to the proper depth, when recessing is desired.

Figure 11:
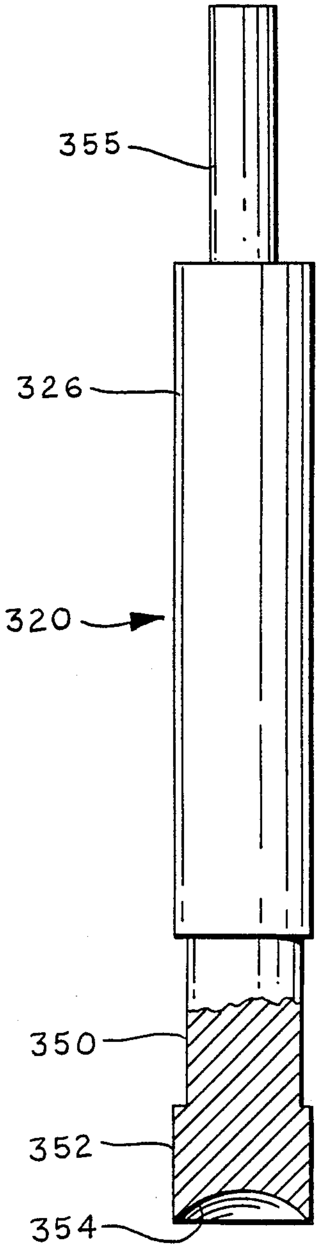
FIG. 11 is a longitudinal, partly sectional view showing a further embodiment of the tool of FIG. 2. It incorporates a standard chuck rather than being of the slip-over design.

A further embodiment, as illustrated in FIG. 11, is a solid anchor driving tool 320 having a standard shank 355 for use with a percussion drill having a three jaw chuck 84 as illustrated in FIG. 6.

Figure 12:
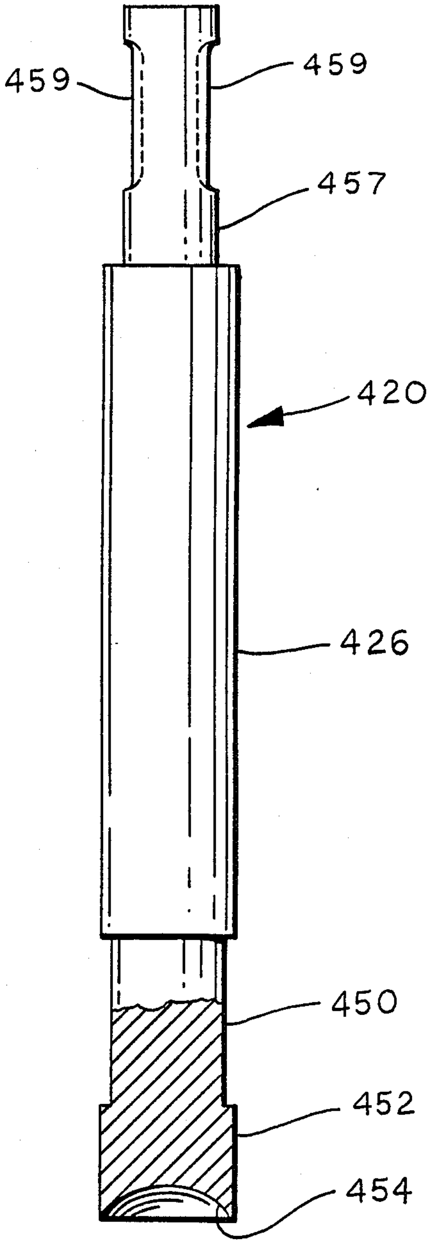
FIG. 12 is a longitudinal, partly sectional view similar to FIG. 11 except with the addition of two longitudinal grooves in the shank, making it compatible with a percussion drill having a snap action keyless chuck.
Figure 13:
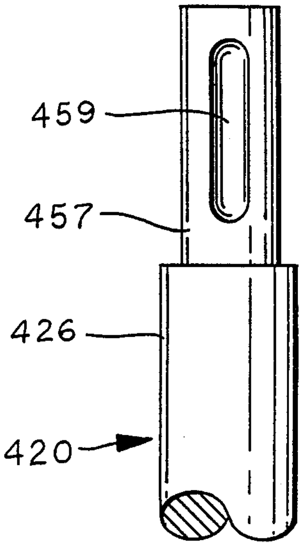
FIG. 13 is a longitudinal, fragmentary view showing a different view of the shank of the tool in FIG. 12.

A further embodiment, as illustrated in FIG. 12, is a solid anchor driving tool 420 employing a snap action keyless chuck shank 457 with two snap action keyless chuck shank grooves 459. This tool 420 is compatible with the percussion drill having a snap action keyless chuck 56 in FIG. 1. Another view of the snap action keyless chuck shank 457 is illustrated in FIG. 13.

It is apparent to one skilled in the art that modifications and variations to the invention described are possible within the spirit of the invention and the invention is not to be limited by the above description but only by the scope of the appended claims and their reasonable equivalents.

We claim:

1. A tool which drives and sets primarily concrete and masonry anchors of various designs, heretofore driven and set with a hammer, by enabling the reciprocating action of a power actuated percussion drill to be transferred to said anchors, with said tool comprising:

a longitudinal generally cylindrical body containing a cylindrical, longitudinal coaxial cavity having a coaxial opening at said tool's first extremity whereby the exposed portion of either a readily available snap action keyless chuck drill bit or a readily available standard shank drill bit assembled with said percussion drill can be inserted therein, and a spring clip to prevent said tool from inadvertently slipping off either of said drill bits, and means to removably retain said spring clip to said tool, and driving means at said tool's second extremity for said tool whereby said tool maintains a desired driving relationship with said anchor during use therewith.

2. The tool of claim 1 wherein said cavity opening is tapered and resembles a cylindrical female embrasure, and wherein said female embrasure substantially mates with a male tapered shoulder adjacent to the shank area of said snap action drill bit, and wherein said female embrasure substantially mates with a male tapered shoulder of a locking adapter collar where said adapter collar is used to make said standard shank drill bit compatible with said female embrasure of said tool, and whereby said drill bit remains centered within said tool for stability, and whereby said drill bit maintains an appropriate depth within said cavity which prevents the cutting tip of said drill bit and said chuck from contacting any surfaces of said tool, thus avoiding damage during use therewith.

3. The tool of claim 1 wherein said means to removably retain comprises an internal coaxial chamber whereby said cavity passes through said chamber containing said spring clip therein.

4. The tool of claim 3 wherein said spring clip comprises at least one flat inwardly curved longitudinal leaf arranged to apply pressure substantially inwardly toward the axis of said cavity whereby said leaf makes tensioned contact with said drill bit when said drill bit is inserted into said cavity therein.

5. The tool of claim 3 wherein said tool further includes two coaxial sections having interconnecting means whereby said sections can be disassembled to access said spring clip within said chamber therein.

6. The tool of claim 5 wherein said interconnecting means comprises a coaxial male threaded area on the adjoining end of said first section and a compatible coaxial female threaded area on the adjoining end of said second section.

7. The tool of claim 1 wherein said means to removably retain comprises an external annular recess having dimension substantially the same as the internal dimensions of a corresponding portion of said spring clip whereby said spring clip can be tightly retained in said annular recess therein.

8. The tool of claim 7 wherein said tool further includes a port leading to said cavity and adjacent to said annular recess whereby said spring clip can make contact with said drill bit when said drill bit is inserted into said cavity.

9. The tool of claim 1 wherein said driving means comprises a coaxial generally concave recess with the plane of the circumferential rim of said concave recess being perpendicular to the axis of said tool and said concave recess having substantially the same diameter as said tool's second extremity and opening away from said tool whereby said concave recess creates a relationship between said tool and said anchor similar to a socket and ball arrangement which facilitates the driving and setting of said anchor with both coaxial and non-coaxial alignments.

10. The tool of claim 9 wherein said concave recess includes:

a curvature substantially equal to or less than the curvature of the top of said anchor or the like, and an inside diameter of the circumferential rim which is substantially equal to or greater than the outside diameter of the top of said anchor or the like, and whereby said curvature and said diameter are sufficient to properly drive and set said anchor while preventing said tool from slipping off said anchor during use at various angles.

11. The tool of claim 1 wherein said driving means comprises:

a cylindrical longitudinal coaxial plunger shaft of a diameter substantially the same as the inside diameter of a mostly hollow anchor of the design used in a recessed fashion, and of suitable length to drive a plunger within said mostly hollow anchor and thus setting said mostly hollow anchor, and a cylindrical coaxial set ring, adjacent to said plunger shaft, of a diameter substantially the same as the outside diameter of said mostly hollow anchor and of a length substantially the same as the amount of recess desired between the top of a hole in said concrete or masonry and the top of said mostly hollow anchor within said hole whereby said mostly hollow anchor is maintained in the recessed fashion.

* * * * *